United States Patent
Osawa et al.

(10) Patent No.: US 8,081,378 B2
(45) Date of Patent: Dec. 20, 2011

(54) MICROSCOPE

(75) Inventors: Hisao Osawa, Kashiwa (JP); Hiroshi Ooki, Yokohama (JP); Yumiko Ouchi, Tokyo (JP); Yasuo Yonezawa, Zushi (JP)

(73) Assignee: Nikon Corporation, Tokyo (JP)

( * ) Notice: Subject to any disclaimer, the term of this patent is extended or adjusted under 35 U.S.C. 154(b) by 452 days.

(21) Appl. No.: 11/887,822

(22) PCT Filed: Sep. 22, 2006

(86) PCT No.: PCT/JP2006/318875
§ 371 (c)(1),
(2), (4) Date: Oct. 4, 2007

(87) PCT Pub. No.: WO2007/043314
PCT Pub. Date: Apr. 19, 2007

(65) Prior Publication Data
US 2009/0268280 A1  Oct. 29, 2009

(30) Foreign Application Priority Data

Oct. 13, 2005 (JP) ................................ 2005-299329
Feb. 1, 2006 (JP) ................................ 2006-024851

(51) Int. Cl.
*G02B 21/06* (2006.01)
*G02B 21/00* (2006.01)

(52) U.S. Cl. ................... 359/385; 359/368; 359/558

(58) Field of Classification Search .......... 359/368–390, 359/487–489, 497–501, 558–576
See application file for complete search history.

(56) References Cited

U.S. PATENT DOCUMENTS

| | | | | |
|---|---|---|---|---|
| 4,963,724 A | * | 10/1990 | Neumann | 250/201.3 |
| 5,969,855 A | * | 10/1999 | Ishiwata et al. | 359/386 |
| 6,020,963 A | * | 2/2000 | DiMarzio | 356/491 |
| 6,239,909 B1 | * | 5/2001 | Hayashi et al. | 359/569 |
| RE38,307 E | | 11/2003 | Gustafsson et al. | |
| 6,839,166 B2 | * | 1/2005 | Fukushima et al. | 359/368 |
| 7,075,058 B2 | * | 7/2006 | Chinn et al. | 250/234 |
| 2006/0147176 A1 | * | 7/2006 | Takamatsu et al. | 385/147 |

FOREIGN PATENT DOCUMENTS

| | | |
|---|---|---|
| JP | A-11-064797 | 3/1999 |
| JP | A-11-242189 | 9/1999 |
| JP | A-2002-311335 | 10/2002 |
| JP | A-2003-262798 | 9/2003 |

OTHER PUBLICATIONS

W. Lukosz, "Optical Systems with Resolving Powers Exceeding the Classical Limit. II," *Journal of the Optical Society Of America*, vol. 57, No. 7, Jul. 1967, pp. 932-941.
W. Lukosz et al., "Optischen Abbildung unter Überschreitung der beugungsbedingten Auflösungsgrenze," *Opt. Acta.*, vol. 10, 1963, p. 241-255.

* cited by examiner

*Primary Examiner* — Thong Nguyen
(74) *Attorney, Agent, or Firm* — Oliff & Berridge, PLC

(57) ABSTRACT

A microscope apparatus can generate information of a super-resolved image at high speed. For that purpose, the microscope apparatus of the present invention is equipped with an image-forming optical system for forming an intermediate image of light emitted from a specimen, a relay optical system for forming an image of the intermediate image, an illuminating optical system that jointly owns an optical path of the image-forming optical system and illuminates the specimen through the optical path of the image-forming optical system, and a spatial modulator disposed on a formation plane of the intermediate image. In this microscope apparatus, the specimen is subjected to structured illumination by an image of the spatial modulator. Light from the specimen which is modulated by the structured illumination is automatically remodulated in the spatial modulator.

15 Claims, 6 Drawing Sheets

MICROSCOPE

CROSS-REFERENCE TO RELATED APPLICATIONS

This application is a U.S. National Stage application claiming the benefit of prior filed International Application No. PCT/JP2006/318875, filed Sep. 22, 2006, in which the International Application claims priorities from Japanese Application Numbers 2005-299329 (filed on Oct. 13, 2005) and 2006-024851 (filed on Feb. 1, 2006) the entire contents of which are incorporated herein by reference.

TECHNICAL FIELD

The present invention relates to a microscope apparatus.

BACKGROUND ART

A method for spatially modulating illuminating light is known a method of observing a specimen such as a biological specimen or the like with super-resolution (see patent documents 1, 2, non-patent documents 1, 2 or the like). According to this method, the spatial frequency of the structure of the specimen is modulated by spatially modulated illuminating light, and information of the spatial frequency having high resolution exceeding the limit of resolution is contributed to the image formation of the optical system of the microscope.

However, in order to observe a super-resolved image, a modulated image of a specimen (modulated image) is required to be demodulated. The demodulation method is roughly classified into two kinds of methods, optical demodulation (see non-patent documents 1, 2) and calculation-based demodulation (see patent documents 1, 2). The optical demodulation is implemented by re-modulating the modulated image by using a spatial modulator such as a grating or the like.

Patent Document 1: Japanese Unexamined Patent Application Publication No. Hei 11-242189
Patent Document 2: Specification of U.S. Re-issued Pat. No. 38307
Non-patent Document 1: W. Lukosz, "Optical systems with resolving powers exceeding the classical limit. II", Journal of the Optical Society of America, Vol. 37, PP. 932, 1967
Non-patent Document 2: W. Lukosz and M. Marchand, Opt. Acta. 10, 241, 1963

DISCLOSURE

Problems to be Solved

However, the calculation-based demodulation needs much time because complicated calculation processing is required, and thus it is difficult to observe a specimen on a real-time basis.

On the other hand, the optical demodulation uses a spatial modulator such as a grating or the like, and thus it does not need so much time. However, the demodulating accuracy is dependent on the form accuracy, arrangement accuracy or the like of a spatial modulator, and thus it is difficult to obtain an excellent super-resolved image.

According to the demodulation method (optical demodulation) described in the Non-patent Document 2, an optical path associated with modulation and an optical path associated with demodulation are set in parallel, and different parts of a common grating are used for the modulation and the demodulation respectively to thereby improve the arrangement accuracy. However, the pupil of the optical system associated with the modulation and the pupil of the optical system associated with the demodulation cannot be set to be conjugated with each other, and thus this method has a drawback that the observation visual field is extremely narrow.

Therefore, the present invention has an object to provide a microscope apparatus that can generate information of a super-resolved image at high speed.

SUMMARY OF THE INVENTION

A microscope apparatus according to the present invention is characterized by including: an image-forming optical system that forms an intermediate image of light emitted from a specimen; a relay optical system that forms an image of the intermediate image; a spatial modulator arranged on a formation plane of the intermediate image; and an illuminating optical system that commonly has an optical path of the image-forming optical system and projects a pattern of the spatial modulator through the optical path of the image-forming optical system onto the specimen, thereby illuminating the specimen.

The microscope apparatus according to the present invention may be further equipped with a phase-changing unit that changes the phase of an illumination pattern formed when the pattern of the spatial modulator is projected onto the specimen by the illuminating optical system.

Furthermore, the microscope apparatus according to the present invention may be further equipped with a direction-changing unit that changes the direction of a illumination pattern formed when the pattern of the spatial modulator is projected onto the specimen by the illuminating optical system.

Furthermore, the microscope apparatus according to the present invention may be further equipped with a detecting unit that detects the image of the intermediate image to generate the data of the image, and an obtaining unit that obtains time quadrature data of the image during the change of the phase from the detecting unit.

Still furthermore, the microscope apparatus according to the present invention may be further equipped with a direction-changing unit that changes the direction of an illumination pattern formed when the pattern of the spatial modulator is projected onto the specimen by the illuminating optical system, and the obtaining unit may obtain the time quadrature data in each of plural states whose directions are different from one another.

The microscope apparatus according to the present invention may be further equipped with a calculating unit that combines a plurality of the obtained time quadrature data.

Furthermore, the calculating unit may average spatial frequency components commonly contained in the plural time quadrature data to combine the time quadrature data.

Furthermore, the microscope apparatus according to the present invention may be further equipped with a detecting unit that detects an image of the intermediate image to generate the data of the image concerned, a direction changing unit that changes the direction of an illumination pattern formed when a pattern of the spatial modulator is projected onto the specimen by the illuminating optical system, and an obtaining unit that obtains time quadrature data of the image during the change of the phase and the direction from the detecting unit.

Furthermore, a charge-storable image sensor may be used as the detecting unit, and the obtaining unit may set the charge-storage time of the image sensor to be substantially equal to a time for which the phase of the illumination pattern varies at an integer period.

Furthermore, an image sensor which is not a charge-storable image sensor is used as the detecting unit, and the obtaining unit may provide each pixel with an integrating circuit or a low pass filter having a time constant which is substantially equal to a time for which the phase of the illumination pattern varies at an integer period.

The microscope of the present invention may be equipped with at least a detecting unit that detects an image of the intermediate image to generate the data of the image, and it is desired that an image-side numerical aperture NA' of the relay optical system satisfies NA'>a·$NA_{obj}$/M wherein $NA_{obj}$ represents the image-side numerical aperture of the image-forming optical system, M represents an imaging magnification of the image-forming optical system and a represents a constant, and the constant a is calculated by back calculation from the contrast of the image detected by the detecting unit through the image-forming optical system and the relay optical system in consideration of an image-contrast limit which can be resolved by at least the tone of the detecting unit.

Furthermore, it is desired that the range of the constant a satisfies 2<a.

It is desired that the upper limit of the spatial frequencies of the illumination pattern formed when the pattern of the spatial modulator is projected onto the specimen by the illuminating optical system is determined in consideration of MTF and pupil diameter of the image-forming optical system and the relay optical system, and the lower limit of the spatial frequencies of the illumination pattern is determined in consideration of a super-resolution effect.

The spatial frequency k of the illumination pattern formed when the pattern of the spatial modulator is projected onto the specimen by the illuminating optical system is represented by k=b*(2*NA/λ), it is desired that 0.5<b<0.98. However, NA represents the numerical aperture, λ represents the wavelength and b represents a constant.

Furthermore, it is desired that the spatial modulator is a grating, and the ratio e1 of the intensity of 1st-order diffraction light to the intensity of 0th-order diffraction light satisfies 0.37<e1<1.9.

According to the present invention, a microscope apparatus that can generate information of a super-resolved image at high speed is implemented.

BEST MODE DETAILED DESCRIPTION OF THE EMBODIMENT

First Embodiment

A first embodiment of a microscope according to the present invention will be described.

First, the construction of the microscope apparatus will be described.

Figure 1:
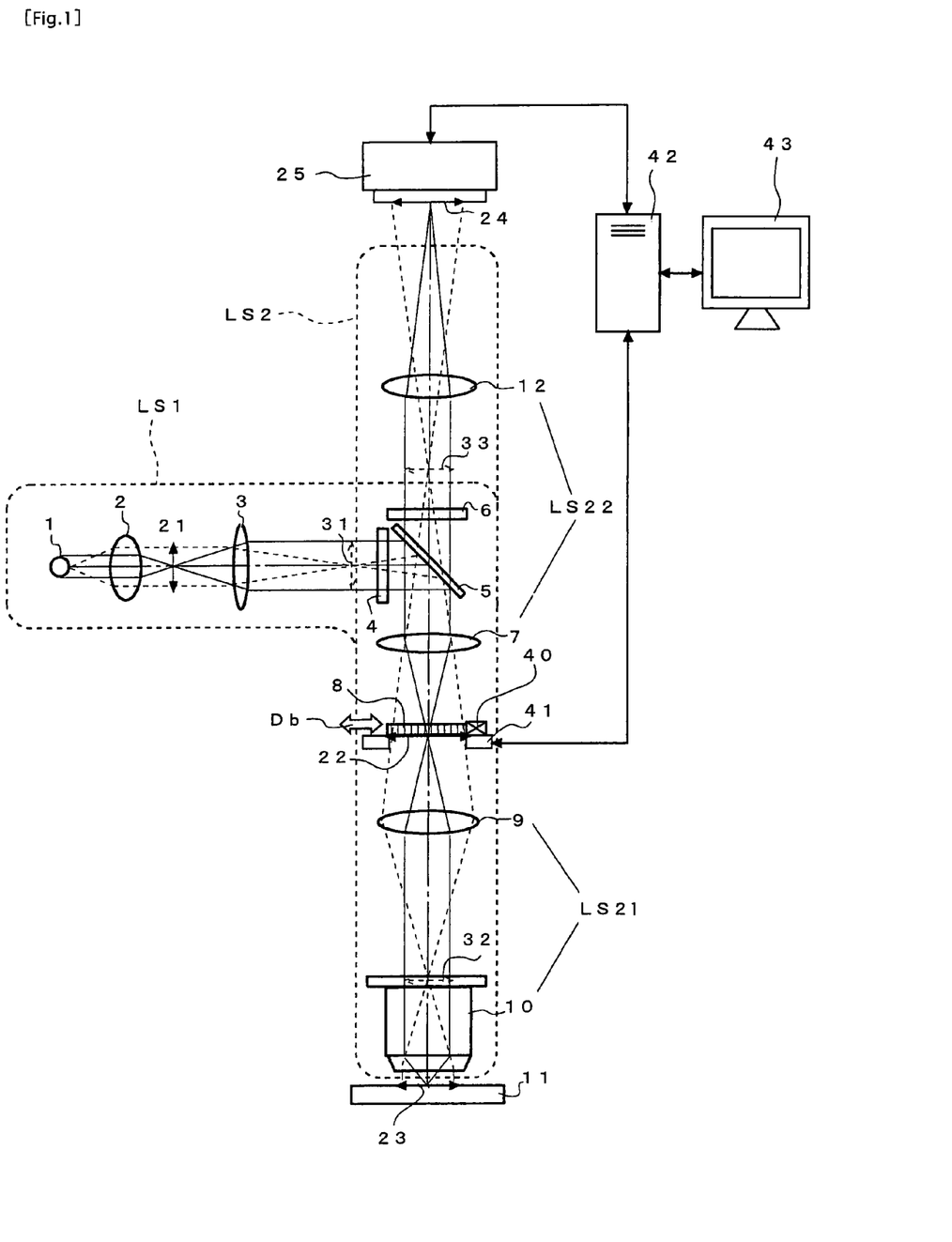
FIG. 1 is a schematic diagram showing a microscope apparatus according to a first embodiment.

FIG. 1 is a schematic diagram showing the microscope apparatus. As shown in FIG. 1, in the microscope apparatus are disposed a light source 1, a collector lens 2, a lens 3, an excitation filter 4, a dichroic mirror 5, a lens 7, a grating 8, a second objective lens 9, an objective lens 10, a specimen labeled with fluorescent dye (biological specimen or the like) 11, a barrier filter 6, a lens 12, an imaging unit (CCD camera or the like) 25, a control-calculating unit (circuit, a computer or the like) 42, a display unit 43, an actuator 40, and a rotating stage 41.

The light source 1, the collector lens 2, the lens 3, the excitation filter 4, the dichroic mirror 5, the lens 7, the grating 8, the second objective lens 9, and the objective lens 10 constitute an illuminating optical system LS1. The objective lens 10, the second objective lens 9, the grating 8, the lens 7, the dichroic mirror 5, the barrier filter 6, and the lens 12 constitute an observational optical system LS2. The objective lens 10 and the second objective lens 9 constitute an image-forming optical system L21, and the lens 7 and the lens 12 constitute a relay optical system LS22. The illuminating optical system LS1 and the observational optical system LS2 own jointly the optical path from the objective lens 10 to the dichroic mirror 5.

The light from the light source 1 of the illuminating optical system LS1 is converted to collimated light in the collector lens 2, and forms a light source image on a pupil conjugate plane 31 by the lens 3. The light from the light source image 31 is subjected to wavelength selection by the excitation filter 4, and then it is deflected by the dichroic mirror 5 and enters the common optical path between the illuminating optical system LS1 and the observational optical system LS2. Then, the light is focused onto the conjugate plane 22 of the specimen 11 by the lens 7. The light emitted from the conjugate plane 22 is incident on the lens 9 through the grating 8 disposed on the conjugate plane 22 and converted to collimated light. Thereafter, an image 23 of the grating 8 is formed on the specimen 11 through the objective lens 10 (at this time, the light source image 32 is formed on the rear-side focal plane of the objective lens 10), whereby the specimen 11 is illuminated by the spatially-modulated illumination light (structured illumination).

Here, the grating 8 is a phase type grating or an amplitude type grating having a one-dimensional period structure, for example. Particularly, the amplitude type grating is preferable because it has an excellent wavelength characteristic and a white light source is usable as the light source 1. A single-wavelength light source may be used in place of the white light source. Or, light from a laser light source may be guided by an optical fiber and a secondary light source formed on the end face of the optical fiber may be used as the light source 1.

In order to make the brightness distribution of the structured illumination (the brightness distribution of the image 23 of the grating 8) a sinusoidal shape, it is desired to remove extra diffraction components occurring in the grating 8, the order thereof being equal to 2 or more. At this time, these diffraction components may be removed at a suitable place at the rear stage of the grating 8 (for example, the pupil plane of the objective lens 10). Or, if the density distribution of the grating 8 is set to a sinusoidal shape in advance, occurrence of the extra diffraction components can be suppressed and the loss of the light amount can be suppressed.

Fluorescence occurs on the specimen 11 with the structured-illuminated light as excitation light. At this time, the structure of the specimen 11 which is viewed from the objective lens 10 side is modulated by the structured illumination. Moire fringes occur in the modulated structure. The Moire fringes are formed by the microstructure of the specimen 11 and the pattern of the structured illumination, and the microstructure of the specimen 11 is converted to a spatial frequency band which is lower by the amount corresponding to the spatial frequency of the structured illumination. Accordingly, even light having the structure of the high spatial frequencies whose resolution exceeds the limit of resolution is captured by the objective lens 10.

The fluorescent light captured by the objective lens 10 forms a modulated image of the specimen 11 on the conjugate plane 22 by the image-forming optical system LS21 including the objective lens 10 and the second objective lens 9. The modulated image is remodulated by the grating 8 disposed on the conjugated plane 22. In the thus-occurring remodulated image, the structure of the specimen 11 whose spatial frequency is varied is returned to the original special frequency. The remodulated image contains a demodulated image of the specimen 11.

However, the remodulated image contains diffraction components unnecessary for the demodulated image. The unnecessary diffraction components contains ±1st-order diffraction components occurring in the grating 8 with respect to 0th-order diffraction light emitted from the specimen 11, a 0th-order diffraction component with respect to—1 st-order diffraction light emitted from the specimen 11, and a 0th-order diffraction component with respect to +1st-order diffraction light emitted from the specimen 11. In order to remove these unnecessary diffraction components from the remodulated image, averaging may be carried out by moving the grating 8 by the amount corresponding to one period or N periods (N represents a natural number).

The fluorescent light passes through the lens 7 and the dichroic mirror 5, and then enters the single optical path of the observational optical system LS2. The light concerned is transmitted through the barrier filter 6, and passed through the lens 12 to form a magnified image 24 of the remodulated image. That is, the remodulated image remodulated in the grating 8 is relayed to the magnified image 24 by the relay optical system LS22 including the lens 7 and the lens 12. The magnified image 24 is picked up by the imaging unit 25, and the image data of the remodulated image are generated. When the image pickup is carried out by the imaging unit 25, the image data of the demodulated image could be obtained if remodulated images are accumulated and averaged during the period when the grating 8 is moved by the amount corresponding to one period or N periods (N represents a natural number).

The image data contain information to observe the specimen 11 on the basis of the super-resolved image by the structured illumination. The image data are taken into the control-calculating unit 42, subjected to calculation and then transmitted to the display unit 43.

In the microscope apparatus of this embodiment, the optical path from the conjugate plane 22 of the specimen 11 till the specimen 11 is perfectly set to the common path by the illuminating optical system LS1 and the observational optical system LS2, and the grating 8 is disposed on the conjugate plane 22 concerned. In this microscope apparatus, the microstructure of the specimen 11 is modulated by the grating 8. The modulated microstructure of the specimen 11 is automatically remodulated by the grating 8 disposed at this position.

The grating 8 is movable in a direction Db perpendicular to the grid lines by the actuator 40. This movement changes the phase of the structured illumination. During the period when the control-calculating unit 42 controls the actuator 40 and the imaging unit 25 to accumulate the image data of one frame, the phase thereof is changed by the amount corresponding to one period or N periods (N represents a natural number), whereby the pattern of the structure illumination and the unnecessary diffraction components occurring at the remodulation time are deleted from the image data.

Or, a charge-storable type image sensor such as CCD or the like is used as the image sensor of the imaging unit 25 and the time required for the phase of the structured illumination to vary by only the amount corresponding to one period or N periods (N represents a natural number) is set as an accumulation time, whereby the pattern of the structured illumination and the unnecessary diffraction components occurring at the remodulation time may be deleted.

Or, an image sensor which is not a charge-storable type, such as NMOS, CMOS or the like, is used as the image sensor of the imaging unit 25 and a lowpass filter or an integrating circuit is connected to the output of each pixel, whereby the pattern of the structured illumination and unnecessary diffraction components occurring at the remodulation time may be deleted. At this time, the time constant of the lowpass filter or the integrating circuit to be connected is set to not less than the time required for the phase of the structured illumination to vary by only the amount corresponding to one period or N periods (N represents a natural number).

The grating 8 is rotatable around the optical axis together with the actuator 40 by the rotating stage 41. This variation changes the direction of the structured illumination. The control-calculating unit 42 controls the rotating stage 41 and the imaging unit 25, and obtains image data every time the direction of the structured illumination is varied to plural directions, whereby information for observing super-resolved images over the plural directions can be obtained. Accordingly, the two-dimensional super-resolved image of the specimen 11 can be observed.

A program necessary for the above operation is preinstalled in the control-calculating unit 42 through a recording medium such as CD-ROM or the like or the Internet, for example.

Next, a condition necessary for the relay optical system LS22 of the microscope apparatus of this embodiment will be described.

Figure 2:
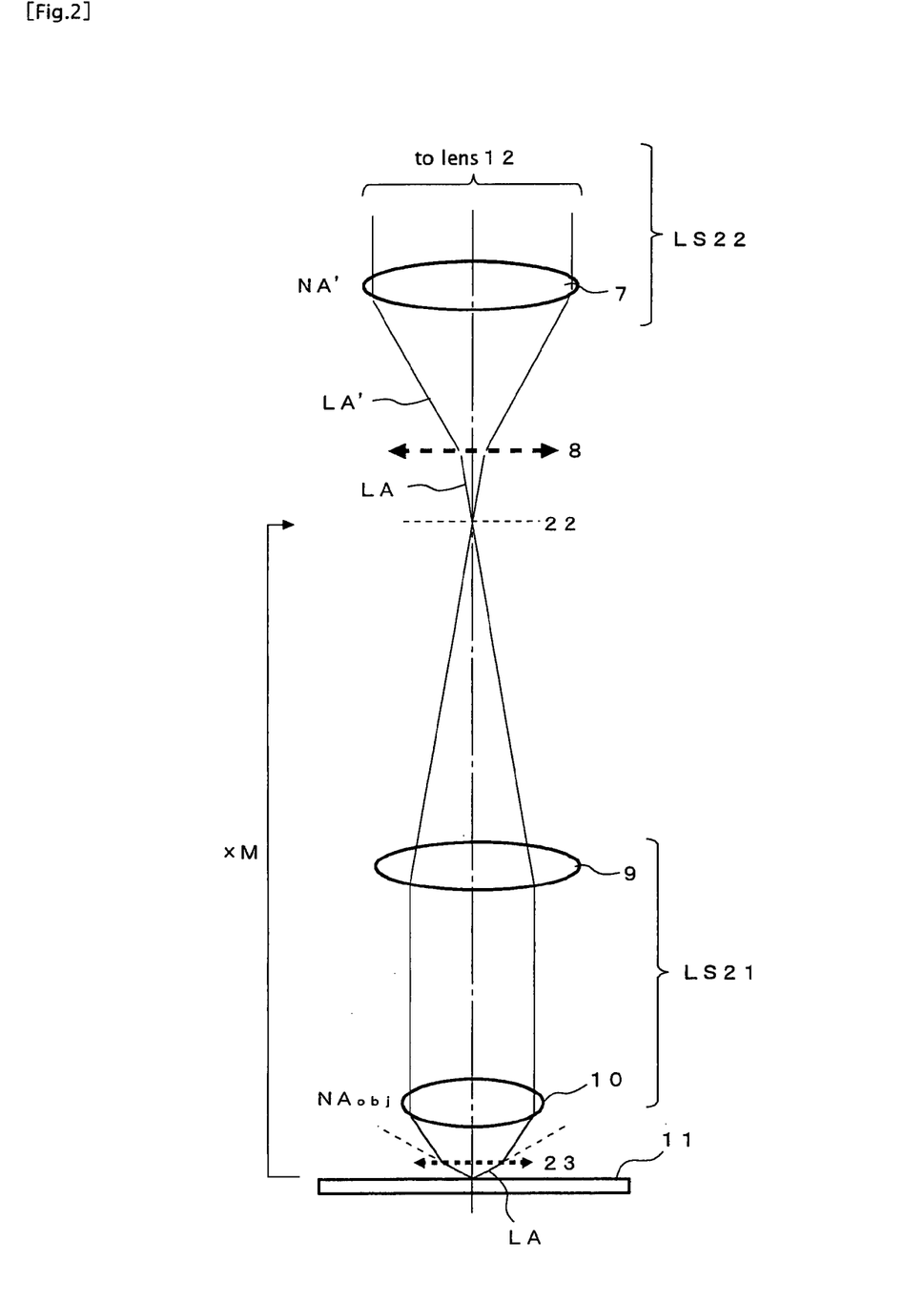
FIG. 2 is a diagram showing the numerical aperture of image-forming light beams from a specimen 11 of an observational optical system LS2 to a lens 7.

FIG. 2 is a diagram showing the numerical aperture of image-forming light beams from the specimen 11 to the lens 7 of the observational optical system LS2 in the microscope apparatus. In FIG. 2, in order to make it easy to understand the variation of the spread of the light beams, the image 23 of the grating 8 and the specimen 11 are illustrated as being displaced from each other, and the conjugate plane 22 of the specimen 11 and the grating 8 are illustrated as being displaced from each other.

As shown in FIG. 2, fluorescent light LA occurring in the structure of the high spatial frequency of the specimen 11 has a large emission angle, so that it normally propagates as indicated by a broken line and thus it cannot enter the pupil diameter of the objective lens 10. However, the fluorescent light LA is modulated by the image 23 of the grating 8 (that is, the structured illumination), and thus the fluorescent light whose emission angle is varied to a low frequency side (that is, small angle) propagates as indicated by a solid line and thus it can enter the pupil diameter of the objective lens 10.

This fluorescent light LA forms an image on the conjugate plane 22 by the image-forming optical system LS21, and it is remodulated in the grating 8. The emission angle of the remodulated fluorescent LA' is returned to a high frequency side (that is, large angle).

In order to guide the image-formed light beams containing the fluorescent light LA' as described above, it is necessary that the image-side numerical aperture NA' of the relay optical system LS22 is set to a large value in advance.

Particularly, as the spatial frequency of the structure illumination (that is, the grating frequency of the grating 8) is higher, the opening angle of the image-forming light beams is larger. Therefore, it is also necessary to increase the image-side numerical aperture NA' of the relay optical system LS22.

However, in general, the super-resolution effect based on the structured illumination is about twice as great as the limit of resolution of the objective lens 10. This is because the upper limit of the spatial frequency of the structured illumination projected onto the specimen 11 by the illuminating optical system LS1 corresponds to the limit of resolution of the objective lens 10. Accordingly, it is merely required only that the image-side numerical aperture NA' of the relay optical system LS22 is large to some extent.

For example, it is assumed that the numerical aperture of the objective lens 10 in the image-forming optical system LS21 is equal to 1.49 and the imaging magnification of the image-forming optical system LS2 is equal to 60 times. At this time, the numerical aperture of the intermediate image side (diffraction grating 8 side) of the intermediate image side of the image-forming optical system LS21 is equal to the following value.

$$1.49/60=0.024$$

At this time, with respect to the 0th-order, ±1st-order diffraction light beams which can contribute to the demodulation in the light beams remodulated by the grating 8, the centers of these light beams are arranged so as to be spaced from one another at the distance corresponding to the diffraction angle based on the grating 8, and form a circle whose radius corresponds to the pupil diameter of the intermediate image side of the image-forming optical system LS21. Therefore, it has the following value at maximum.

$$3\times 0.024=0.72$$

Accordingly, it is merely required only that the image-side numerical aperture NA' of the relay optical system LS22 is equal to 0.072. It is not so difficult that the relay optical system LS22 satisfies the above specification.

The condition for obtaining this value resides in that the 0th-order, ±1st-order diffraction light beams are arranged at the maximum interval, that is, the maximum super-resolution effect is obtained. However, NA' when the diffraction angle based on the grating 8 is small and thus the maximum super-resolution effect cannot be obtained may be set to be smaller than the above value. Even in this case, it is desired that a value which is about 1.5 times of that of the conventional microscope is brought as the super-resolution effect, and in this case NA' may be set as follows:

$$2\times 0.24=0.048$$

If the above condition is generalized, the following matters (i) and (ii) are obtained.

(i) The image-side numerical aperture NA' of the relay optical system LS22 is required to satisfy at least the equation of $NA'>a\cdot NA_{obj}/M$ with respect to the image-side numerical aperture $NA_{obj}$ of the image-forming optical system SL 21 and the imaging magnification M (a represents a constant, and it is determined dependently on the pupil diameter of the intermediate image side of the image-forming optical system LS21 and the diffraction angle based on the grating 8).

(ii) It is desired that a value of about 1.5 times at minimum is brought as the super-resolution effect. In this case, it is merely required that the image-side numerical aperture NA' of the relay optical system LS22 almost satisfies the equation: $NA'=2NA_{obj}/M$ for the image-side numerical aperture $NA_{obj}$ of the image-forming optical system LS21 and the imaging magnification M. However, realistically, it is required to consider from the viewpoint of the contrast of the image obtained by the imaging unit 25.

The image of the pupil of the image-forming optical system LS21 is formed on the pupil plane of the relay optical system LS22. However, the light from the image-forming optical system LS21 is diffracted by the grating 8, and thus the pupils of the image-forming optical system LS21 are arranged symmetrically with respect to the optical axis as the 0th-order diffraction light, the ±1st-order diffraction light and the ±2nd-order diffraction light.

The spatial frequency component having the normal microscope image is obtained as an interference result of light beams having the same order out of the 0th-order diffraction light, the ±1st-order diffraction light and the ±2nd-order diffraction light. The information of the super-resolved image obtained by subjecting the specimen 11 to the structured illumination is reproduced as an image on the image plane as an interference result of neighboring diffraction light beams like the 0th-order diffraction light beam and the ±1st-order diffraction light beams, the ±1st-order diffraction light beams and the ±2nd-order diffraction light beams, etc.

The complex amplitude of the grating 8 is generally attenuated while the sign thereof inverts. Therefore, the image based on the 0th-order diffraction light and the +1st-order diffraction light is offset by the image based on the +1st-order diffraction light and the +2nd-order diffraction light, the image based on the +2nd-order diffraction light and the +3rd-order diffraction light, . . . , so that the contrast thereof is reduced.

Therefore, there is required a relay optical system LS22 for enabling as many components of 0th-order diffraction light, the ±1st-order diffraction light as possible to pass therethrough and disabling as many components of ±2nd-order and higher diffraction light to pass therethrough.

It is required to determine the image-side numerical aperture NA' of the relay optical system LS22 in consideration of the above consideration content and the detection performance of the imaging unit 25.

When the attenuation of the contrast is considered, the contrast is equal to zero at the spatial frequency of the limit of resolution, and thus estimation is made by using the image contrast of the structure of the spatial frequency which is equal to 90% of the spatial frequency of the limit of resolution. When the numerical aperture of the image-forming optical system LS21 is represented by NA and the wavelength is represented by λ, the limit of resolution kg remodulated by the grating 8 is represented as follows when the spatial frequency of the structured illumination is represented by k0.

$$Kg=2*NA/\lambda+k0$$

When the spatial frequency of 90% of the above spatial frequency is represented by kgh, $$Kgh=0.9*(2*NA/\lambda+k0)$$

Figure 3:
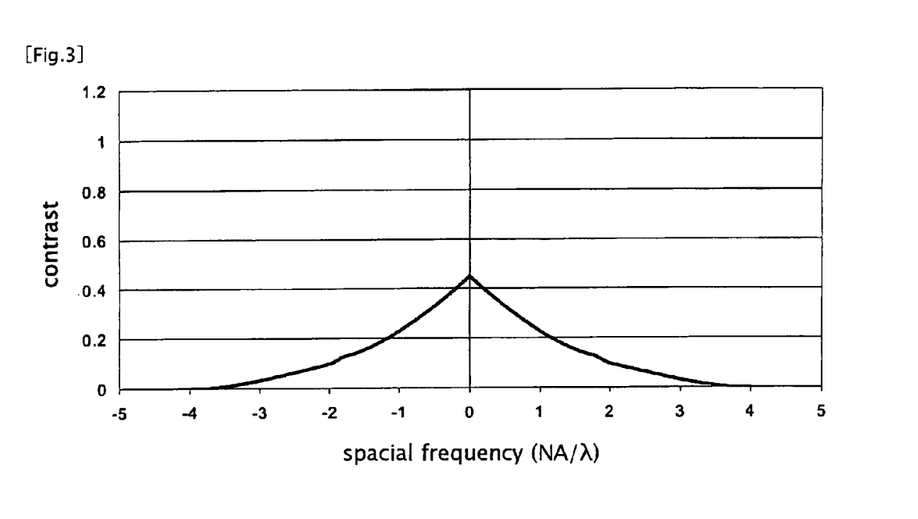
FIG. 3 is a diagram showing a remodulated MTF to a spatial frequency normalized by NA/λ in the microscope apparatus of this embodiment that is calculated by substituting a suitable value into a spatial frequency k0.

FIG. 3 is a diagram showing remodulated MTF for the spatial frequency normalized by NA/λ in the microscope apparatus of this embodiment, which is calculated by substituting a proper value into the spatial frequency k0. However, the pupil diameter of the relay optical system LS22 is set to such a size that only the 0th-order diffraction light and the ±1st-order diffraction light diffracted by the grating 8 enter the image-side pupil of the image-forming optical system LS21.

The remodulated MTF for the spatial frequency kgh is calculated with reference to FIG. 3. From FIG. 3, the normalized spatial frequency (the value on the abscissa axis) when MTF is equal to zero is equal to about 3.7, and on the basis of the estimation based on the spatial frequency of 90% of 3.7 (about 3.7*0.9=about 3.33), the value of MTF at that time is equal to about 0.025.

When an image sensor of 1024 gray scales is used as the imaging unit 25, the lowest value of the image contrast which can be recognized by the image sensor is equal to 2/1024≅0.002. In this case, the observation can be performed till the spatial frequency at which MTF of kgh is equal to 0.002, and the spatial frequency of 90% of the normalized spatial frequency under the limit of resolution described above can be sufficiently observed.

When an image sensor of 256 gray scales is used as the imaging unit 25, the lowest value of the image contrast which can be recognized by the image sensor is equal to 2/256≅0.01. In this case, the spatial frequency of 90% of the normalized spatial frequency under the limit of resolution described above can be sufficiently observed.

Furthermore, the pitch of the structured illumination (the pitch of fringes) is required to be within a predetermined range to obtain a proper super-resolved image in consideration of the situation of the unit and the optical system. A factor for determining the lower limit of the pitch (to what extent the pitch is made minute) is attenuation of the fringe contrast based on MTF of the image-forming optical system LS21. A factor for determining the upper limit of the pitch (to what extent the pitch is made rough) is the super-resolution effect (the rate of increasing the resolving power).

First, a method of determining the lower limit of the pitch will be described. The following two kinds of TFT should be considered to determine the pitch.

(1) MTF of the image-forming optical system LS21 when the pattern of the grating 8 is projected to the specimen 11 through the image-forming optical system LS21 by using light having a predetermined wavelength is represented by $MTF_{il}$. The contrast of the structured illumination is determined by $MTF_{il}$.

(2) MTF of the image-forming optical system LS21 when light having a predetermined wavelength (reflection light, fluorescent light) from the specimen 11 which is subjected to structured illumination forms an image on the image sensor through the observational optical system LS is represented by $MTF_{im}$. The contrast of the image on the image sensor is determined by $MTF_{im}$.

Here, in the case where the illumination light is incoherent (for example, the light source is a lamp or the like), MTF described in (1) is attenuated as the pitch of the pattern of the grating 8 is more minute. On the other hand, in the case where the illumination light is coherent, $MTF_{il}=1$ irrespective of the pitch if the pitch of the pattern is equal to or higher than the resolution of the optical system. With respect to MTF described in (2), the attenuation is required to be considered when the image formation from the specimen 11 till the image sensor corresponds to incoherent imaging (in the case where fluorescent light (incoherent light) from the specimen 11 forms an image even when the illumination light is incoherent or the illumination light is coherent). In the case of the coherent image formation, if the pitch of the patter is equal to or higher than the resolution of the optical system as in the case of (1), $MTF_{im}=1$ and thus attenuation is not required to be considered. However, the resolving power in the case of the coherent image formation is half of that in the case of the incoherent imaging, and it is not unfit to the object of the present invention. Therefore, this situation is not considered here.

In the case of incoherent illumination-incoherent imaging, the total MTF is represented as follows.

$$MTF_{total1}=MTF_{il}*MTF_{im}$$

Here, $MTF_{im}$ represents MTF which covers the relay optical system after remodulation and the preceding units thereto.

In the case of coherent illumination-incoherent imaging, the total MTF is represented as follows.

$$MTF_{total2}=1*MTF_{im}$$

The reciprocal number (the spatial frequency of the fringes) of the pitch of the structure illumination is represented by k, and the value of k is represented by introducing a parameter b for normalizing the limit of resolution of the optical system (λ/2NA) as follows.

$$K=b*(2*NA/\lambda)$$

Figure 4:
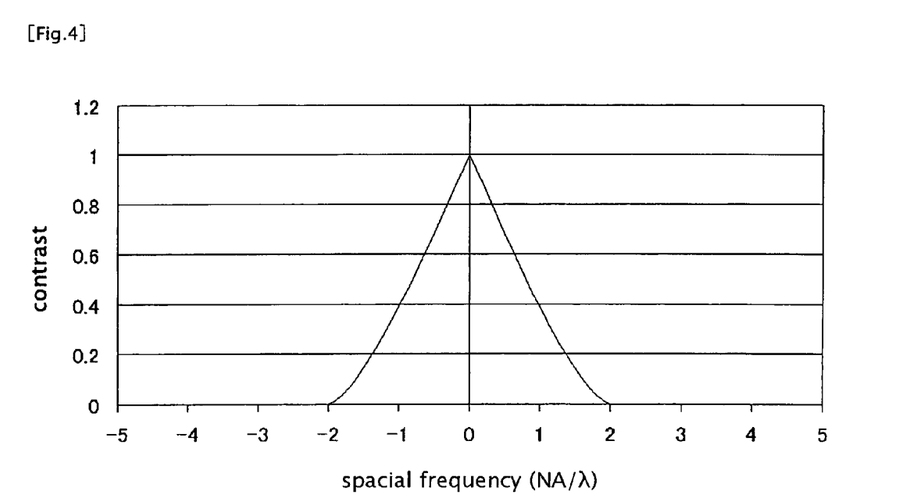
FIG. 4 shows MTF of incoherent imaging of an aplanatic optical system when the spatial frequency is normalized by NA/λ.

FIG. 4 shows MTF of the incoherent imaging of the aplanatic optical system in when the spatial frequency is normalized by NA/λ. That is, when MTF for the spatial frequency k is considered, the abscissa axis of FIG. 4 may be replaced by 2b.

When the image unit 25 is an image sensor of 1024 gray scales, the lower limit of the obtained contrast is equal to 0.002. Accordingly, (1) In the case of incoherent illumination-incoherent imaging, $$MTF_{total1}=MTF_{il}*MTF_{im}>0.002$$

$$MTF_{il}*MTF_{im}>0.002$$

Here, $MTF_{il}=MTF_{im}$, and thus $MTF_{il}>0.045$ is required.

(2) In the case of coherent illumination-incoherent imaging, $$MTF_{total2}=1*MTF_{im}>0.002$$

$MTF_{im}>0.002$ is required.

In the case of (1): $MTF_{il}=MTF_{im}>0.045$, from FIG. 4, 2b<1.77, that is, b<0.89. In the case of (2), $MTF_{im}>0.002$, from FIG. 4, 2b<1.97, that is, b<0.98. Likewise, when the image sensor of the imaging unit 25 has 256 gray scales, the lower limit of the contrast to be obtained is equal to 0.01. Therefore, in the case of (1), $MTF_{il}=MTF_{im}>0.1$, and from FIG. 4, 2b<1.61, that is, b<0.81. In the case of (2): $MTF_{im}>0.01$, and from FIG. 4, 2b<1.91, that is, b<0.96.

Furthermore, the others are set to the same conditions, and the lower limit of the contrast to be obtained by the imaging unit 25 is set to 0.015 while it is provided with some margin, In the case of (1), $MTF_{il}=MTF_{im}>0.12$, and from FIG. 4, 2b<1.55, that is, b<0.78. In the case of $MTF_{im}>0.015$ of (2), from FIG. 4, 2b<1.89, that is, b<0.95.

From the range of b which is selectively calculated in accordance with the coherency condition in illumination and image formation as described above, the range of k is determined by using the objective lens NA of the illumination and the illumination wavelength (excitation wavelength) in the case of 1), and the objective lens NA of the image formation and the observation wavelength (fluorescent light wavelength) in the case of 2) with respect to the set prescribed NA, λ.

Next, a method of determining the upper limit of the pitch will be described.

The super-resolution effect α is represented by α=(2*NA/λ+k)/(2*NA/λ). That is, k=(2*NA/λ)*(α−1), and thus the value of k is determined by using the prescribed NA, λ (the wavelength of reflection or fluorescent light) which are set dependently on the value of the super-resolution effect α.

Likewise, if k=b*(2*NA/λ), b=α−1. Therefore, for example, if the super-resolution effect α is magnified to 1.5 times, b=0.5. If it is magnified to 1.7 times, b=0.7.

It is summarized as follows: the preferable range of b is set to 0.5<b<0.98.

Furthermore, when the light source 1 is shifted in a direction perpendicular to the lattice pattern of the grating 8 with respect to the optical axis of the illuminating optical system LS1 by a predetermined amount and the 0th-order light and the 1st-order diffraction light by the grating 8 are symmetrical with respect to the optical axis of the illuminating optical system LS1, the spatial frequency of the structure illumination formed on the specimen 11 can be set to be higher. The predetermined shift amount s may be set according to the following equation when the composite focal distance of the optical system from the light source 1 to the grating 8 is represented by fc and the 1st-order diffraction angle of the grating 8 is represented by θg:

[Equation 1]

$$s = fc \times \sin\left(\frac{\theta g}{2}\right) \quad (1)$$

Here, the ratio of the intensity of the 1st-order diffraction light to the intensity of the 0th-order light of the grating 8 is required to be within some predetermined range so that the contrast of the structure illumination formed on the specimen 11 and the spectral component ratio of MTF of the demodulated image are optimized.

For example, when the spatial frequency of the structure illumination is set to the same level as the limit of resolution and the image of the light source 1 is condensed to two points which are farthest from each other in the radial direction of the pupil plane of the illuminating optical system LS1, the contrast C1 of the structured illumination formed on the specimen 11 is represented as follows when the ratio of the 1st-order diffraction light intensity i11 to the 0th-order light intensity i10 of the grating 8 in the illuminating optical system LS1 is represented by e1:

[Equation 2]

$$C1 = \frac{(1+\sqrt{e1})^2 - (1-\sqrt{e1})^2}{(1+\sqrt{e1})^2 + (1-\sqrt{e1})^2} \quad (2)$$

The contrast C1 of the structure illumination is preferably high. If C1>0.8, the range of 0.25<e1<3.9 . . . (A) could be obtained.

The 0th-order light intensity i10 and the 1st-order diffraction light intensity i11 in the grating 8 is represented as follows.

[Equation 3]

$$i11 = \frac{j - i10}{2} \quad (3)$$

Here, j=0.8 when the amplitude distribution or phase distribution of the grating 8 has a rectangular shape, or j=1 when it has a sinusoidal shape.

Furthermore, the specimen 11 is diffracted by this structured illumination, and with respect to the diffraction intensity at this time, the 1st-order diffraction intensity I1 is represented as follows.

[Equation 4]

$$I1 = \frac{C1}{4} \quad (4)$$

The 0th-order light intensity I0 is represented as follows.

[Equation 5]

$$I0 = \frac{1 - I1}{2} = \frac{4 - C1}{8} \quad (5)$$

The ratio of the 1st-order diffraction light intensity i21 to the 0th-order light intensity i20 when the image-forming light from the specimen 11 is remodulated by the grating 8 of the image-forming optical system LS21 is represented by e2. In this case, the following equation is obtained.

[Equation 6]

$$e2 = \frac{I1}{I0} \times e1 \quad (6)$$

It is preferable that e2 is high. However, when e2 exceeds 1, the spectral intensity of the low frequencies is lowered and thus the demodulated image becomes an image in which the high frequency components of the structure of the specimen 11 are emphasized. Therefore, this is not preferable. In consideration of a spectral intensity distribution which is familiar in a general optical system, e2 may satisfy e2>0.15. At this time, e1>0.37, and this defines the range of (B).

Furthermore, by time-integrating the unnecessary diffraction components after the remodulation, conversion to DC components is carried out and thus the demodulated image is obtained. The rate d of the DC components at this time is represented as follows.

[Equation 7]

$$d = 1 - i20 - 2 \times i21 = 1 - I0 \times i10 - 2 \times I1 \times i11 \quad (7)$$

From the equation (3), d is further represented as follows.

[Equation 8]

$$d = 1 - I0 \times \frac{j}{2e1+1} - 2 \times I1 \times \frac{e1 \times j}{2e1+1} \quad (8)$$

For j=1 and d<0.8, e1<6.6, and for d<0.7, e1<1.9 . . . (c)

In consideration of the ranges of (A), (B), (C), the preferable range of e1 is represented as follows when e1 represents the ratio of the 1st-order diffraction light intensity to the 0th-order light intensity i10 of the grating 8 in the illumination optical system LS1:

0.37<e1<1.9

The intensity ratio of the 1st-order diffraction light to the 0th-order light intensity is generally determined by Step, Duty ratio in the case of a phase type grating and by OD (optical density), Duty ratio in the case of a density type grating. The manufacturing parameters described above may be controlled to obtain the preferable e1.

Next, the operation associated with the control of the control-calculating unit 42 will be described.

Figure 5:
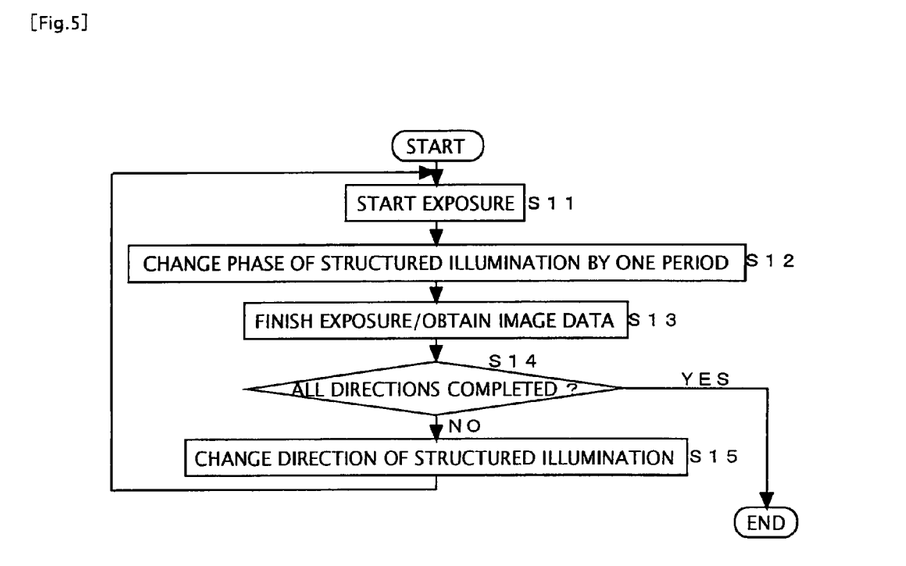
FIG. 5 is a flowchart showing the operation associated with the control of a control-calculating unit 42 according to the first embodiment.

FIG. 5 is a flowchart showing the operation associated with the control of the control-calculating unit 42. As shown in FIG. 5, the control-calculating unit 42 changes the phase of the structure illumination by the amount corresponding to only the one period during the period from the start of exposure (step S11) till the end of exposure (step S13) of the imaging unit 25 (step S12) when image data after remodulation are obtained.

The thus-obtained image data corresponds to the time quadrature of the remodulated image during the phase change of the structured illumination, and the brightness distribution of the structure illumination is sinusoidal, so that the pattern of the structured illumination is deleted from the image data. Furthermore, unnecessary diffraction components occurring at the remodulation time are also deleted from the image data. Accordingly, the image data represent a demodulated image. In place of the above manner, some methods may be applied to delete the pattern of the structured illumination and the unnecessary diffraction components.

Furthermore, the control-calculating unit 42 changes the direction of the structured illumination (step S15), and executes the processing of the steps S11 to S13 again to obtain image data of another demodulated image from which the pattern of the structured illumination is deleted.

The processing of obtaining the image data of the demodulated image in the above steps S11 to S13 is repeated until the direction of the structured illumination is set to all the predetermined directions (until the judgment of step S14 is YES), and the image data of the demodulated images from which the pattern of the structured illumination is deleted are obtained by the amount corresponding to the number of the set directions.

For example, the control-calculating unit 42 repeats the processing of the steps S11 to S13 until the direction of the structured illumination is set to three directions of 0°, 120°, 240° to achieve image data $I_1$, $I_2$, $I_3$ of three demodulated images from which the pattern of the structure illumination is deleted. The direction of the super-resolved image is different every 120° among the image data $I_1$, $I_2$, $I_3$ of these demodulated images.

Next, the operation associated with the calculation of the control-calculating unit 42 will be described.

Figure 6:
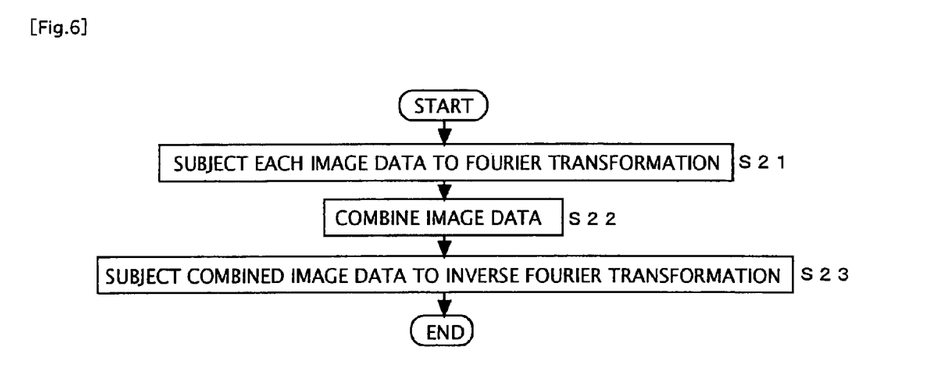
FIG. 6 is a flowchart showing the operation associated with the calculation of the control-calculating unit 42.

FIG. 6 is a flowchart showing the operation associated with the calculation of the control-calculating unit 42. In this case, the calculation when the image data $I_1$, $I_2$, $I_3$ of three demodulated images which are different from one another in the direction of the super-resolved image every 1200 will be described.

First, the control-calculating unit 42 subjects the respective image data $I_1$, $I_2$, $I_3$ to Fourier transformation to achieve image data $I_{k1}$, $I_{k2}$, $I_{k3}$ of three demodulated images expressed in the wave number space (step S21). The image data $I_{k1}$, $I_{k2}$, $I_{k3}$ of these demodulated images are shown in FIGS. 7(A), (B), (C).

Figure 7:
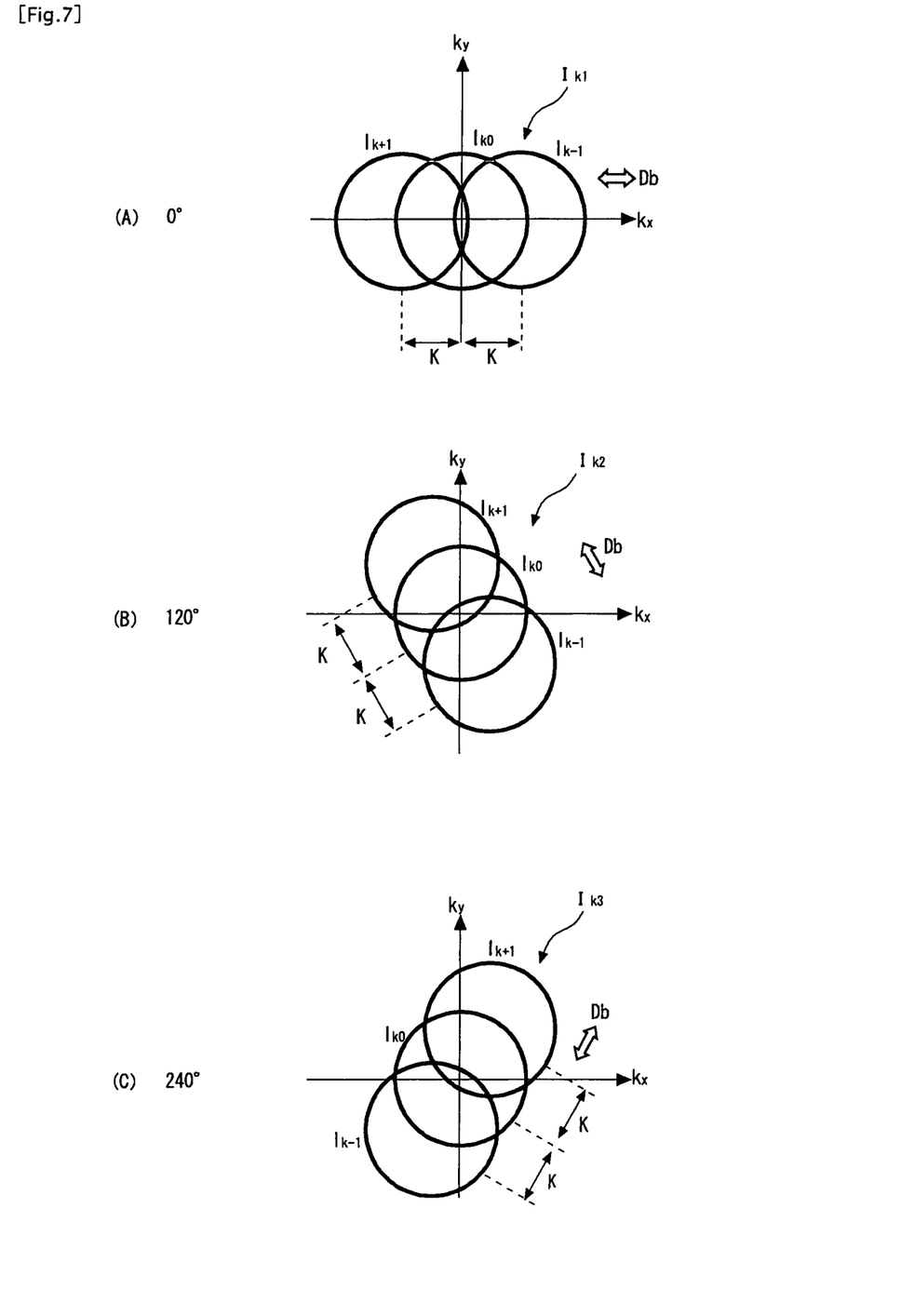
FIG. 7 is a diagram showing a step S21.

In FIGS. 7(A), (B), (C), the symbols $I_{k+1}$, $I_{k-1}$ represent components (±1st-order modulation components) transferred by the image-forming optical system LS21 under the modulated state (as ±1st-order diffraction light), and the symbol $I_{k0}$ represents a component (0th-order modulation component) transferred by the image-forming optical system LS21 under the non-modulated state (as 0th-order diffraction light). The symbol Db represents the direction of the super-resolved image (the direction of the structured illumination), and the symbol K represents the spatial frequency of the structured illumination.

Figure 8:
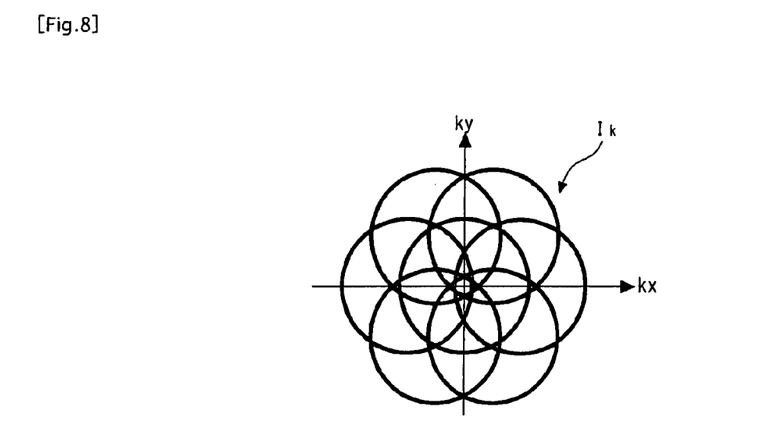
FIG. 8 is a diagram showing a step S22.

Subsequently, the control-calculating unit 42 combines the image data $I_{k1}$, $I_{k2}$, $I_{k3}$ of the three demodulated images on the wave number space as shown in FIG. 8 to obtain one composite image data $I_k$ (step S22).

The respective data ranges of the image data $I_{k1}$, $I_{k2}$, $I_{k3}$ of the three demodulated images are overlapped with one another (contain common spatial frequency components). Therefore, when these data are combined, the control-calculating unit 42 averages the overlapped values thereof, and sets the average value as data of the composite image data $I_k$. Through this averaging operation, the contribution of the low frequency components to the composite image data $I_k$ is suppressed from being greater, thereby preventing the relative contribution of high frequency components from being weaker.

Subsequently, the control-calculating unit 42 subjects the composite image data $I_k$ to inverse Fourier transformation to achieve image data I represented in the real space. The image data I represents the super-resolved image of the specimen 11 over three directions which are displaced from one another every 120° (step S23). The control-calculating unit 42 transmits the image data I to the image display device 43 to display the super-resolved image.

In the microscope apparatus of this embodiment, light from the specimen 11 is remodulated by the grating 8 and further averaged by moving the grating 8 to remove unnecessary diffraction components as shown in FIG. 1, thereby achieving the demodulated image. Accordingly, the image data of the demodulated image is achieved at higher speed because the demodulation operation is not carried out.

In addition, the same area of the same grating 8 is used for both the modulation and the remodulation. Therefore, even if there is any form error or arrangement error in the grating 8, the modulation pattern and the remodulation pattern can be made identical to each other. Accordingly, the form error or the arrangement error of the grating 8 brings very little noise to the image data of the demodulated image. The same is also applied to a case where the phase of the structured illumination is changed or a case where the direction of the structured illumination is changed. Accordingly, the microscope apparatus of this embodiment can provide a super-resolved image with high precision.

Furthermore, in the microscope apparatus of this embodiment, since the grating 8 is disposed on the conjugate plane 22 of the specimen 11, the remodulated image formed on the conjugate plane 22 is required to be relayed and then picked up by the image sensor 25. However, the relay optical system LS22, etc. of the microscope apparatus of this embodiment satisfy the above conditions (the conditions (i), (ii), and other conditions), and thus information necessary for the super-resolved image can be surely obtained.

Furthermore, in the microscope apparatus of this embodiment, when plural image data are combined (step S22 of FIG. 6), the spatial frequency components which these image data commonly have are averaged, and thus an excellent super-resolved image in which the high frequency components are little attenuated can be achieved.

Second Embodiment

A second embodiment of the microscope apparatus of this invention will be described. In this case, only the difference from the first embodiment will be described. The difference resides in the operation of the control-calculating unit 42.

Figure 9:
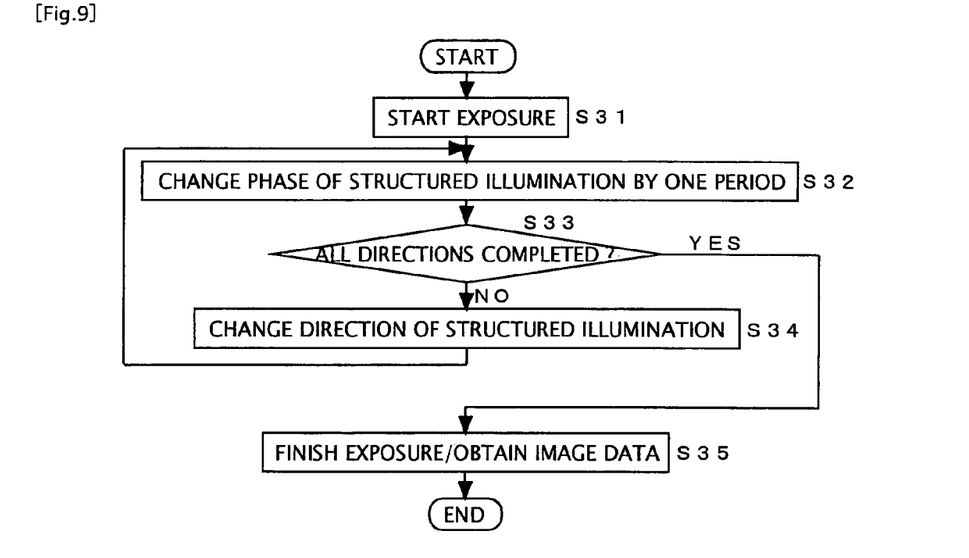
FIG. 9 is a flowchart showing the operation associated with the control of the control-calculating unit 42 according to a second embodiment.

FIG. 9 is a flowchart showing the operation associated with the control of the control-calculating unit 42 of this embodiment. As shown in FIG. 9, when the image data of a demodulated image is obtained, the control-calculating unit 42 changes the phase of the structured illumination by the amount corresponding to one period during the period from the start of exposure (step S31) of the imaging unit 25 till the end of exposure (step S35) of the imaging unit 25 (step S32), further changes the direction of the structured illumination (step S34), and executes phase changing processing in step S32 again.

The phase changing processing in this step S32 is repeated until the direction of the structured illumination is set to all the predetermined directions (until the judgment of step S33 is YES), and then the control-calculating unit 42 finishes the exposure of the imaging unit 25 and obtains the image data (step S35).

For example, the control-calculating unit 42 repeats the phase changing processing in step S32 until the direction of the structured illumination is set to the three directions of 0°, 120° and 240°, and the image data of a demodulated image from which the pattern of the structured illumination is deleted is obtained.

The image data of the demodulated image thus obtained represents the time quadrature of the remodulated image not only during the change of the phase of the structured illumination, but also during the change of the direction of the structured illumination. Accordingly, the image data of the demodulated image represents the super-resolved image of the specimen 11 over plural directions under the unchanged state. Accordingly, the control-calculating unit 42 of this embodiment directly transmits the image data of the demodulated image to the display unit 43 to display the super-resolved image.

In this embodiment, not only the phase of the structured illumination, but also the direction thereof are changed within the exposure period of the imaging unit 25, and thus the super-resolved image can be achieved at higher speed as compared with the first embodiment.

In this embodiment, the grating 8 having the one-dimensional structure period and the actuator 40 for moving the grating 8 in one direction (the direction perpendicular to the grid lines) are used. However, if a grating having a two-dimensional period structure and an actuator for moving the grating in two directions (directions perpendicular to the grid lines) are used, information of super-resolved images over the two directions can be obtained substantially simultaneously, and thus the processing speed can be further increased.

[Others]

In the microscope apparatus of each embodiment, the relayed remodulated image (magnified image 24) is detected by the imaging unit 25. However, the enlarged view 24 may be deformed so as to be observable with an eye through an eyepiece.

Furthermore, the microscope apparatus of each embodiment described above uses the grating as the spatial modulator, however, another spatial modulator taking the same action to incident light beams may be used.

For example, if a spatial modulator such as a transmission type liquid crystal display device or the like is used in place of the grating 8, the phase change and direction change of the structured illumination can be electrically performed. Therefore, the microscope apparatus can be constructed with using neither the actuator, nor the rotating stage, and the processing speed can be further increased.

Furthermore, in each of the above-described embodiments, the present invention is applied to a fluorescent microscope. However, the present invention is not limited to the fluorescent microscope, and a reflection microscope may be likewise constructed.

The many features and advantages of the embodiments are apparent from the detailed specification and, thus, it is intended by the appended claims to cover all such features and advantages of the embodiments that fall within the true spirit and scope thereof. Further, since numerous modifications and claims will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A structured illumination microscope apparatus comprising:
    an illuminating optical system including a spatial modulator receiving light beams from a light source and forming interference fringes into a specimen by interfering different diffraction light beams of the light beams formed by the spatial modulator;
    an image forming optical system jointly owning an optical path with the illuminating optical system and forming a modulated image on the spatial modulator, in which the modulated image is due to light from the specimen and subjected to a modulation effect by the interference fringes; and
    a relay optical system forming a remodulated image that is remodulated by the spatial modulator.

2. The structured illumination microscope apparatus according to claim 1, further comprising a phase-changing unit changing a phase of the interference fringes that form into the specimen by the illuminating optical system.

3. The structured illumination microscope apparatus according to claim 2, further comprising:
    a detecting unit detecting the remodulated image and generating data of the image;
    a direction-changing unit changing a direction of the interference fringes that form into the specimen by the illuminating optical system; and
    an obtaining unit obtaining time quadrature data of the remodulated image during the changes of the phase and the direction.

4. The structured illumination microscope apparatus according to claim 2, further comprising:
    a detecting unit detecting the remodulated image and generating data of the remodulated image; and an obtaining unit obtaining time quadrature data of the remodulated image during a change of a phase from the detecting unit.

5. The structured illumination microscope apparatus according to claim 4, further comprising a direction-changing unit changing a direction of the interference fringes that form into the specimen by the illuminating optical system, wherein the obtaining unit obtains the time quadrature data in each of a plurality of states that are different in the direction.

6. The structured illumination microscope apparatus according to claim 5, further comprising a calculating unit combining said obtained plural time quadrature data.

7. The structured illumination microscope apparatus according to claim 6, wherein
the calculating unit combines the plural time quadrature data and averages spatial frequency components commonly contained in the plural time quadrature data.

8. The structured illumination microscope apparatus according to claim 4, wherein
a charge-storable image sensor is used as the detecting unit, and the obtaining unit makes an accumulation time of the image sensor substantially equal to a time for which the phase of the interference fringes is subjected to integer period variation.

9. The structured illumination microscope apparatus according to claim 4, wherein
an image sensor not of a charge-storable type is used as the detecting unit, and the obtaining unit has an integrating circuit or a low pass filter having a time constant that is substantially equal to a time for which the phase of the interference fringes is subjected to integer period variation, provided to each pixel of the image sensor.

10. The structured illumination microscope apparatus according to claim 1, further comprising a direction-changing unit changing a direction of the interference fringes that form into the specimen by the illuminating optical system.

11. The structured illumination microscope apparatus according to claim 1, further comprising at least a detecting unit detecting the remodulated image and generating data of the remodulated image, wherein an image-side numerical aperture NA' of the relay optical system satisfies an equation $NA' > a \cdot NA_{obj}/M$ for an image-side numerical aperture $NA_{obj}$ of the image-forming optical system, an imaging magnification M of the image-forming optical system and a constant a, and
the constant a is calculated by back calculation from contrast of the image detected by a detecting unit through the image-forming optical system and the relay optical system in consideration of an image-contrast limit that can be resolved with at least gray scales of the detecting unit.

12. The structured illumination microscope apparatus according to claim 11, wherein a range of the constant a satisfies an inequality $2 < a$.

13. The structured illumination microscope apparatus according to claim 1, wherein an upper limit of spatial frequencies of the interference fringes that form into the specimen by the illuminating optical system is determined in consideration of MTF of the image-forming optical system and the relay optical system, and a lower limit of the spatial frequencies of the interference fringes is determined in consideration of a super-resolution effect.

14. The structured illumination microscope according to claim 1, wherein a spatial frequency k of the interference fringes that form into the specimen by the illuminating optical system is represented by $k = b*(2*NA/\lambda)$, $0.5 \leq b \leq 0.98$, wherein NA represents a numerical aperture, represents a wavelength and b represents a constant.

15. The structured illumination microscope apparatus according to claim 1, wherein the spatial modulator is a grating, and a ratio e1 of 1st-order diffraction light intensity to 0th-order diffraction light intensity satisfies an inequality $0.37 < e1 < 1.9$.

* * * * *